United States Patent [19]

Johnsen

[11] 4,066,251

[45] Jan. 3, 1978

[54] CONTINUOUS BUSINESS FORM OR THE LIKE ADAPTED FOR SUBSEQUENT PROCESSING INTO COMBINATION MAILING ENVELOPES AND RETURN ENVELOPES HAVING A COMMON BACK PLY PANEL

[76] Inventor: Edward L. Johnsen, 12 Fox Meadow Lane, Wayland, Mass. 01778

[21] Appl. No.: 762,380

[22] Filed: Jan. 25, 1977

Related U.S. Application Data

[60] Continuation of Ser. No. 593,987, July 8, 1975, abandoned, which is a division of Ser. No. 433,462, Jan. 15, 1974, abandoned.

[51] Int. Cl.² .............................................. B41L 43/12
[52] U.S. Cl. ...................................................... 270/37
[58] Field of Search ........................ 270/4, 5, 10, 32, 37, 270/41, 43, 52; 229/69, 68, 71–73; 93/63 R, 63 M, 36 MM, 36 M, 36.01, 35, 61 A

[56] References Cited

U.S. PATENT DOCUMENTS

| | | | |
|---|---|---|---|
| 2,969,003 | 1/1961 | Rapp | 93/63 M |
| 3,665,817 | 5/1972 | Katz | 270/37 |
| 3,743,273 | 7/1973 | Katz | 270/37 |
| 3,899,381 | 8/1975 | O'Brien | 270/37 |
| 3,902,655 | 9/1975 | Huffman | 229/69 |

Primary Examiner—Clifford D. Crowder
Assistant Examiner—A. Heinz
Attorney, Agent, or Firm—J. Warren Kinney, Jr.

[57] ABSTRACT

A continuous business form including a series of connected blanks, adapted to be subsequently processed into combination mailing envelopes and return envelopes having common back ply panels, is produced from a first endless web having at least two panels spanning the width thereof, wherein one panel defines the front ply panel of the mailing envelope and the other panel defines a back ply panel common to both the mailing envelope and the return envelope. A second endless web defining the front ply panel of the return envelope approximates the width of and is disposed in direct overlying relationship with the back ply panel and marginally secured thereto, forming a return envelope pocket, completing the series of interconnected blanks. A third endless web defining inserts adapted to receive original, directly applied indicia is subsequently disposed in direct overlying relationship with the front ply panel of the return envelope and secured to marginal portions thereof.

9 Claims, 24 Drawing Figures

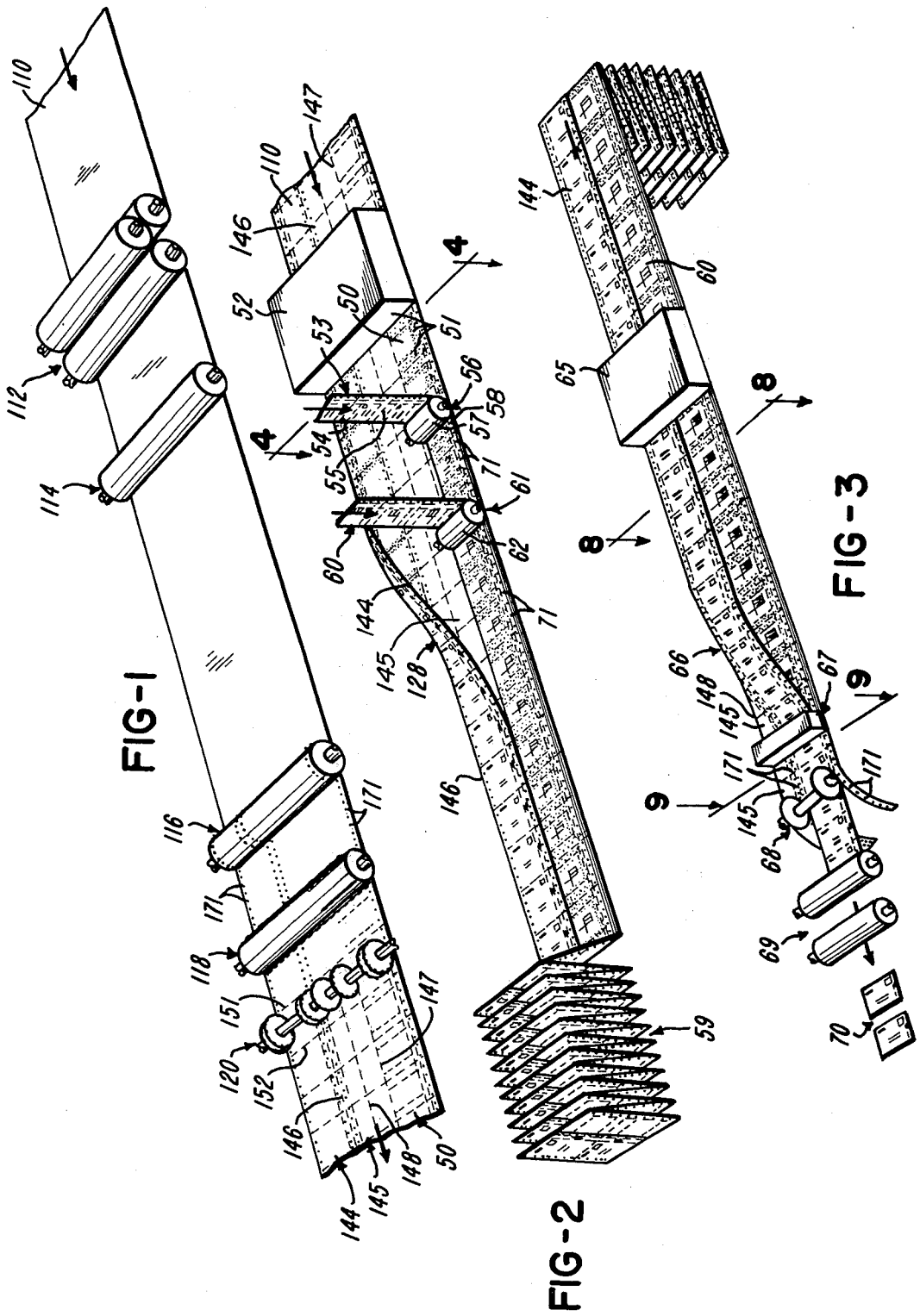

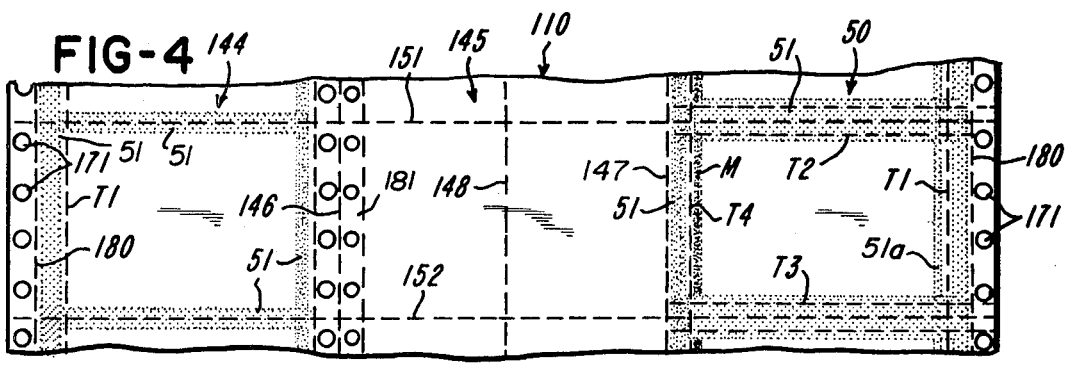
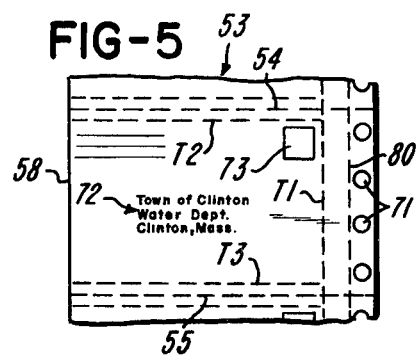
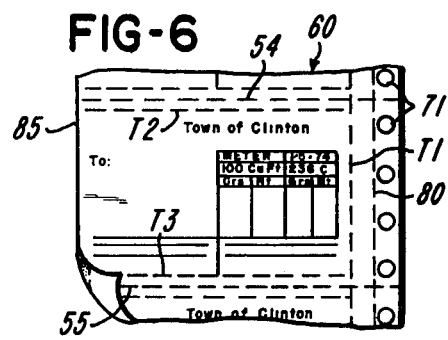
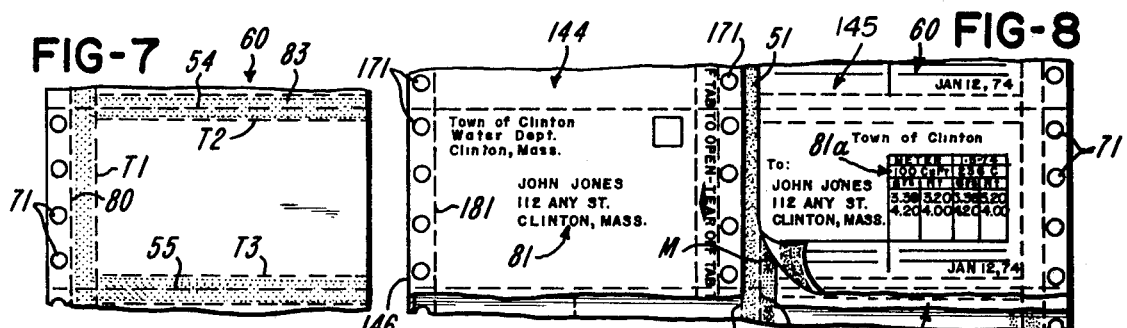
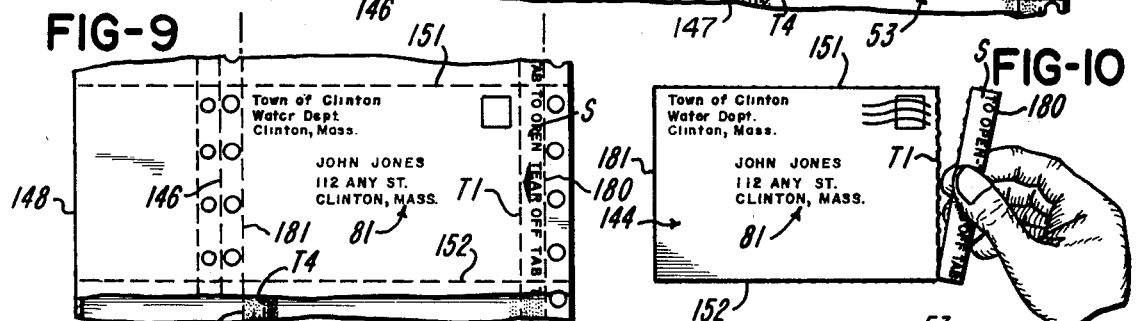
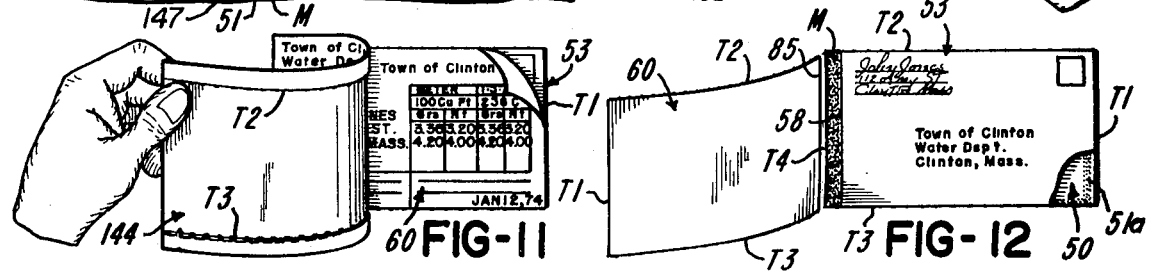

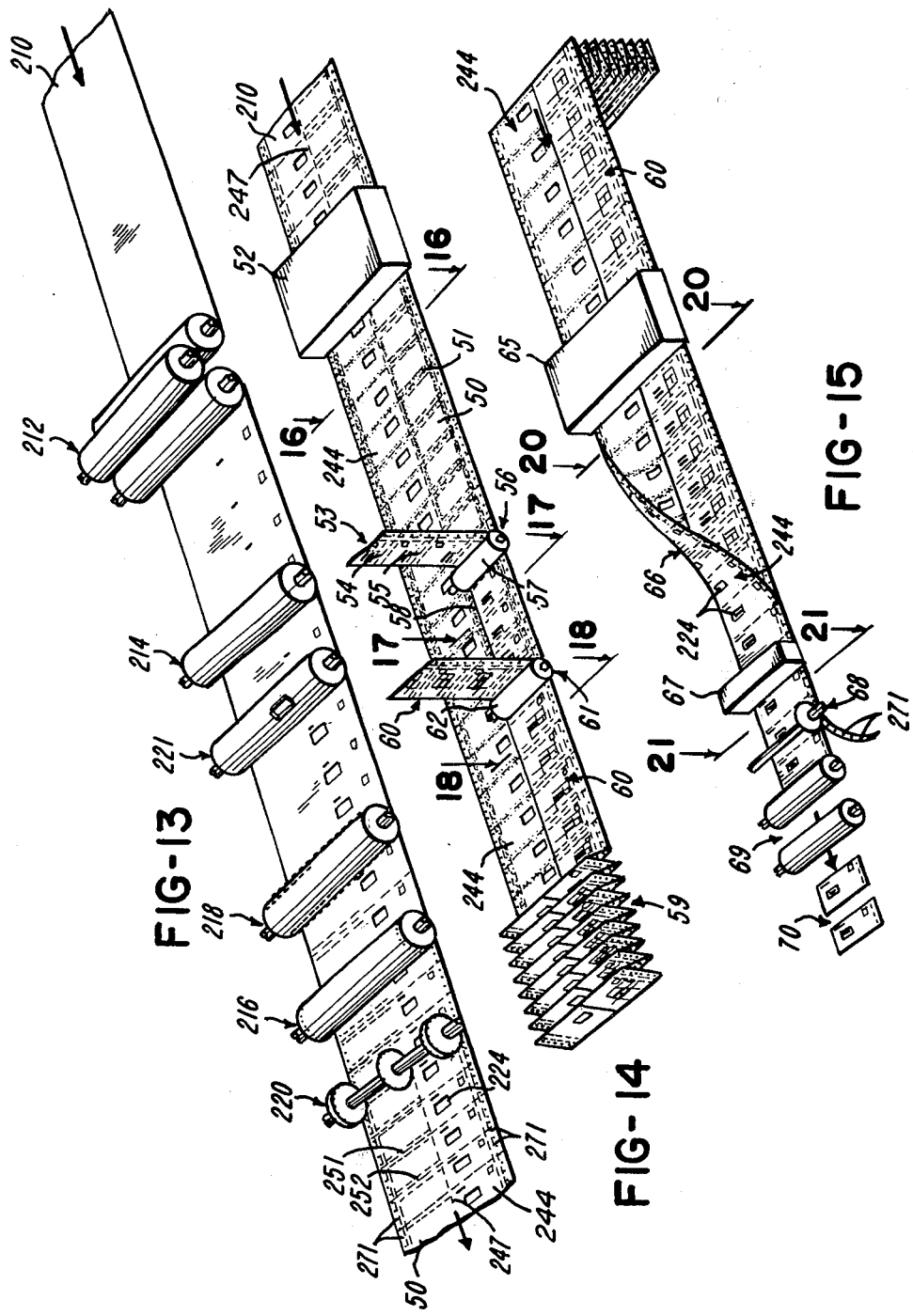

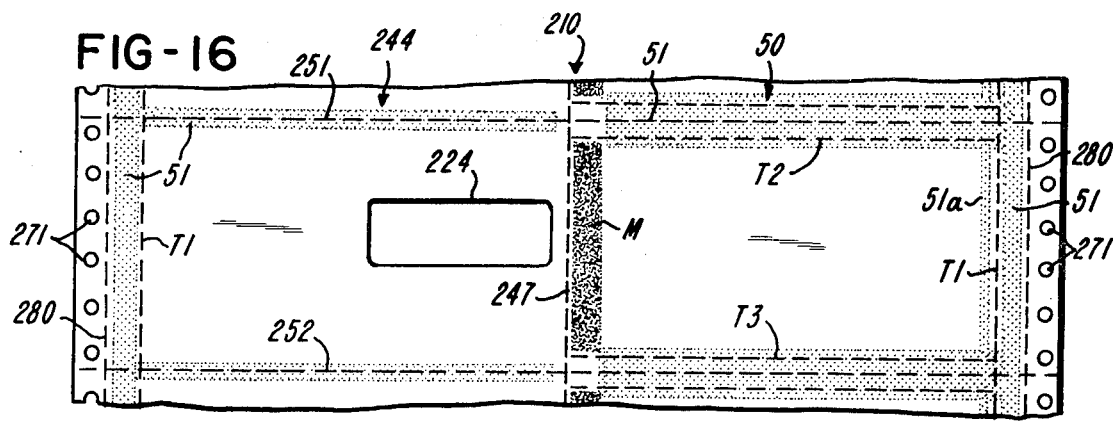
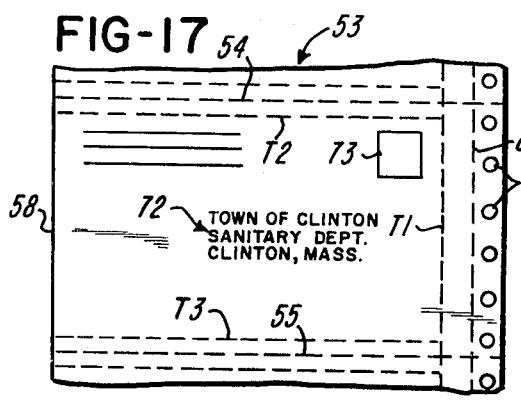
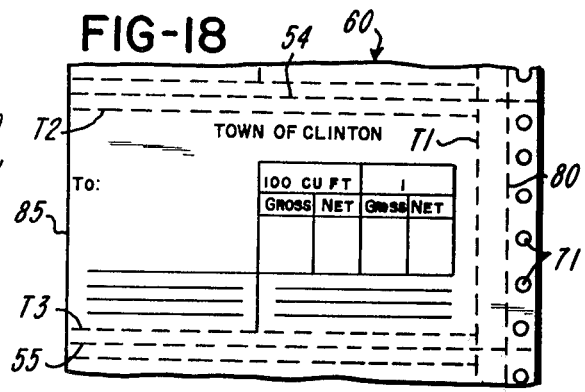
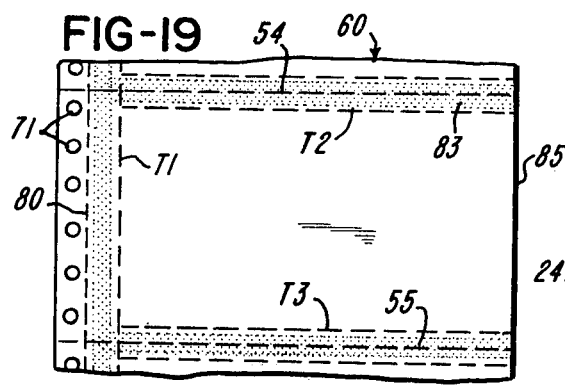
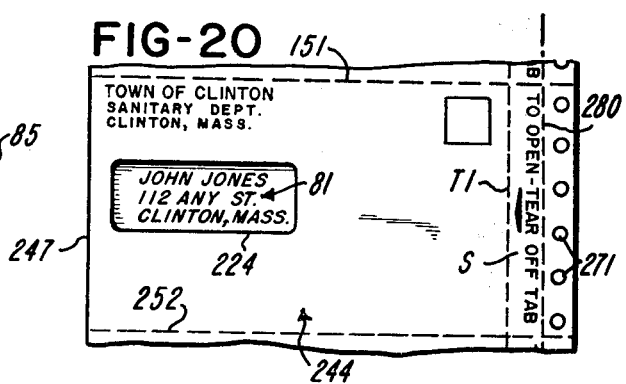
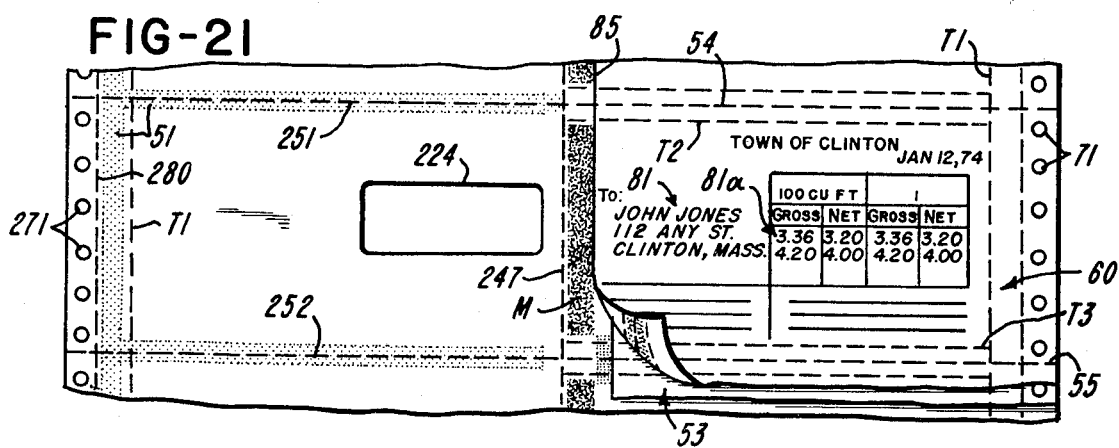

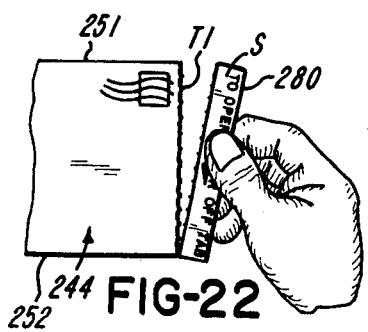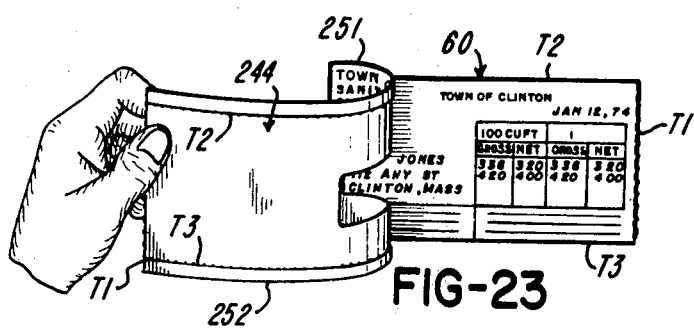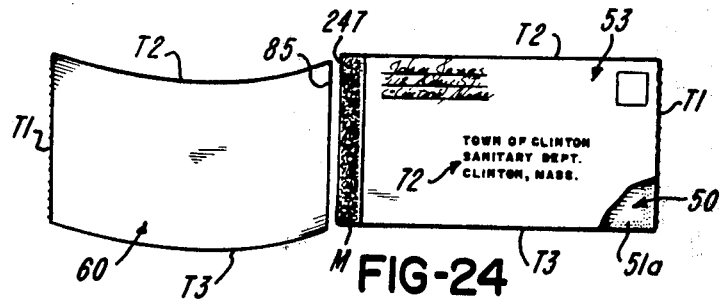

CONTINUOUS BUSINESS FORM OR THE LIKE ADAPTED FOR SUBSEQUENT PROCESSING INTO COMBINATION MAILING ENVELOPES AND RETURN ENVELOPES HAVING A COMMON BACK PLY PANEL

This is a continuation of application Ser. No. 593,987, filed July 8, 1975, which is a division of Ser. No. 433,462, filed Jan. 15, 1974, both of which are now abandoned.

CROSS REFERENCE TO RELATED APPLICATIONS

My patent application Ser. No. 433,463, filed Jan. 15, 1975, and my U.S. Pat. Nos. 3,940,124 and 3,956,049, each specifically disclose a particular genus of continuous business forms, the resulting articles and corresponding methods of manufacture.

My U.S. Pat. No. 3,956,049 discloses a form wherein original indicia may be applied directly to separate surfaces of a cover ply and an under ply of an article formed from a continuous web having at least three longitudinally extending co-planar panels, comprising a cover ply panel and an under ply panel separated by an intermediate, discardible panel, wherein one of the ply panels is disposed in overlying relationship with the discardible panel, thereby placing separate surfaces of the ply panels in side-by-side juxtaposition for application of indicia.

Abandoned application Ser. No. 433,463 discloses a form wherein original indicia may be applied directly to an under ply of an article formed from a continuous web having two contiguous longitudinally extending co-planar panels, comprising a cover ply panel and an under ply panel of a multi-ply article, wherein the cover ply panel is disposed in substantial overlying relationship with the under ply panel, exposing a portion of and concealing a portion of the original indicia contained thereon.

My U.S. Pat. No. 3,940,124 discloses a form wherein original indicia may be applied directly to common surfaces of cover ply and under ply panels of a continuous series of articles utilizing an article blank having three transversely spaced contiguous co-planar panels each defining one ply of the article, wherein the various panels are adapted to be accordion folded into registered zig-zag relationship, thereby producing a multi-ply lottery ticket or the like.

Further, my U.S. Pat. No. 3,837,565 discloses an envelope form produced from a continuous web and in some instances, see particularly FIGS. 29 through 34, includes a combination mailing and return envelope form. The embodiment therein disclosed includes a single web of material which is separated into three panels designated P1, P2 and P3, wherein panel P3 is folded at S onto panel P2 which is in turn folded at T3 onto panel P1 generating a mailing envelope including an insert. After panel P1 is removed from the assembly, panels P2 and P3 may be folded along T4 to form a return envelope.

BACKGROUND OF THE INVENTION

1. Field of the Invention

The field of the invention relates generally to business forms, particularly to a continuous form which comprises a series of connected blanks suited each for processing into a combination mailing envelope and return envelope having a common back ply panel and including insert material bearing original, directly applied indicia. As used herein the term "original indicia" excludes preprinted indicia and indicia applied by transfer means such as carbon paper and the like. The front ply panel of the mailing envelope may or may not be adapted to receive original, directly applied indicia. An example of a mailing envelope containing original indicia is disclosed in my aforementioned U.S. Pat. No. 3,956,049, and an example of a mailing envelope wherein original indicia is not included on the front ply panel is disclosed in my aforementioned abandoned application, Ser. No. 433,463. Each blank of the present invention comprises a first web defining the front ply panel of the mailing envelope in side-by-side juxtaposition with a back ply panel common to both the mailing envelope and a return envelope, and a second web defining the front ply panel of the return envelope disposed in direct, overlying relationship with the back ply panel and adhesively secured to three margins thereof, defining a return envelope pocket. A third web defining insert material bearing original, directly applied indicia is disposed in direct, overlying relationship with the front ply panel of the return envelope and marginally secured thereto.

2. Description of the Prior Art

A numer of patents have issued disclosing combination mailing envelopes and return envelopes. U.S. Pat. Nos. 3,104,799 (particularly FIG. 8) and 3,554,438 (particularly FIGS. 15 and 16) each disclose a mailing envelope assembly which contains a complete return envelope insert. The mailing envelope and return envelope are completely separable from one another, each containing separate and independent front and back ply panels.

U.S. Pat. No. 3,411,699 discloses a mailing envelope which is reusable as a return envelope, wherein a window in the front ply panel thereof exposes an addressee contained on insert material. The top strip of the front ply panel is removed from the mailing envelope, and the insert is reversed, exposing a new addressee, the envelope being resealable to form a suitable return envelope. A modification is provided wherein the various panels of the mailing envelope assembly are adapted to be folded inside-out to form a return envelope, see FIGS. 19–21. Further, FIGS. 11–14 of U.S. Pat. No. 3,411,699 disclose an envelope assembly wherein the back ply panel is common to both the mailing envelope and the return envelope. However, the envelope is not producible from a continuous form generated by two webs wherein insert material may be included bearing original, directly applied indicia. The method for producing the blanks defining each envelope, and the blanks, per se, are neither disclosed nor suggested by this patent.

Further, a number of patents have issued describing particular insert material contained within mailing envelopes, without respect to return envelope structures. U.S. Pat. Nos. 3,104,799; 3,337,120; 3,339,827; 3,608,816; and 3,701,468 each disclose particular insert construction. However, none of these patents disclose insert material bearing original, directly applied indicia.

U.S. Pat. Nos. 3,104,799; 3,339,827; and 3,608,816 are directed to easily removable inserts contained in pre-stuffed, pre-sealed envelopes manufactured in a continuous series. In each case the concealed indicia carried by the insert is pre-printed or is applied by imprint printing or the like. U.S. Pat. Nos. 3,104,799 and 3,339,827 illustrate final articles similar in appearance to the articles of the present invention. However, the inserts included therein are adapted to be readily removable without destruction of the mailing envelope whereas the present invention requires such destruction in order to gain access to insert material contained therein. U.S. Pat. No. 3,104,799 is limited to an assembly wherein three margins of the insert ply are completely free from the mailing envelope, the fourth margin being connected thereto. A tear strip is provided inward of all glue bands along said fourth margin, extending through each ply of the envelope assembly, for gaining access to the envelope pocket for removal of the insert material. Once the tear strip is removed the insert is completely free within the envelope assembly.

U.S. Pat. No. 3,339,827 includes an insert ply which is frangibly attached on all but one margin of the mailing envelope, providing easy removal of the insert after one margin of the outer envelope has been removed to gain access to the envelope pocket. Neither of these patents provides for an integral return envelope having a back ply common to the mailing envelope nor for the insert material bearing original, directly applied indicia.

The present invention, while requiring destruction of the mailing envelope to gain access to insert material, provides an insert having original, directly applied indicia, and provides a return envelope having a back ply panel which is common to the mailing envelope.

Thus, the prior art as disclosed by these patents falls into two categories. The first category discloses combination mailing and return envelopes while the second category discloses stuffed, sealed envelopes containing insert material which is easily removable. None of the above patents provides for a combination mailing envelope and return envelope having a common back ply panel producible from two continuous webs defining a series of connected blanks or for insert material bearing original, directly applied indicia.

SUMMARY OF THE INVENTION

The present invention is directed to a method of producing a series of connected blanks each of which are particularly suited for subsequent processing into a combination mailing envelope and return envelope having a common back ply panel; to said blanks per se; and to the stuffed, sealed envelope assemblies resulting therefrom.

A continuous series of blanks is fabricated from a first endless web of sheet material the width of which is defined by at least two continuous panels one of which defines the front ply panel of the mailing envelope and the other of which defines a back ply panel common to both the mailing envelope and the return envelope and a second endless web of sheet material of a width approximating the width of and disposed in direct, overlying relationship with said back ply panel, defining the front ply panel of the return envelope. Adhesive is selectively applied to marginal portions of the upper surface of the back ply panel, securing the front ply panel of the return envelope thereto, defining a return envelope pocket which is open along a fourth marginal edge. The individual blanks are then suitably accumulated in interconnected relationship for later use.

Generally, in later use, or prior to accumulation of the blanks, a third web is disposed in direct overlying relationship with the front ply panel of the return envelope, providing insert material for the mailing envelope. The blanks are then fed to a computer controlled printer or the like wherein original indicia is applied directly to at least the upper surface of the third web and in some instances to the exposed surface of the front ply panel of the mailing envelope. The front ply panel of the mailing envelope is then folded in direct overlying relationship with the insert ply and the return envelope ply, the assembly then sealed along marginal portions thereof, thereby generating a series of stuffed, sealed mailing envelopes each having an integral return envelope and including insert material bearing original, directly applied indicia. The envelope assemblies are then separated for individual distribution.

Thereafter, the front ply panel of the mailing envelope may be removed, exposing the insert material which is severable from the remaining return envelope. The return envelope includes a sealable pocket for mailing return material to a pre-printed addressee on the front ply thereof.

It is, therefore, an object of the present invention to provide a method of making a series of interconnected blanks each suited for subsequent processing into a combination mailing envelope and return envelope having a common back ply panel.

It is further an object of the present invention to provide insert material containing original, directly applied indicia.

It is further an object of the present invention to provide a family of articles conforming to the various other objectives of the present invention, to wit: a stuffed, sealed envelope assembly comprising a combination mailing envelope and return envelope having a common back ply panel and including insert material bearing original, directly applied indicia.

Other objects and features of the invention will be readily apparent from the following detailed description.

BRIEF DESCRIPTION OF THE DRAWINGS

FIGS. 1, 2 and 3 diagrammatically illustrate steps in the method of making a continuous form comprising a series of interconnected blanks, and articles incorporating features of the present invention.

FIGS. 4–12 illustrate the various steps for producing a continuous form by the process of FIGS. 1–3 and the combination mailing envelope and return envelope obtained therefrom.

FIGS. 13, 14 and 15 diagrammatically illustrate steps in the method of making a modified continuous form comprising a series of interconnected blanks, and articles incorporating features of the present invention.

FIGS. 16–24 illustrate the various steps for producing a continuous form by the process of FIGS. 13–15 and the combination mailing envelope and return envelope obtained therefrom.

DESCRIPTION OF THE PREFERRED EMBODIMENTS

The combination mailing envelope and return envelope of the present invention may be generated from any of a number of properly prepared webs of material wherein the width of the web is defined by at least two continuous, longitudinally extending panels, one of which defines a front ply panel of the mailing envelope and the other of which defines a back ply panel common to the mailing envelope and a return envelope.

One embodiment of a properly prepared continuous web, designated generally by the reference numeral 110, is illustrated in FIGS. 1–12 wherein a discardible panel 145 separates the front ply panel 144 of the mailing envelope from a back ply panel 50, generating a mailing envelope adapted to contain original, directly applied indicia on the exposed surface of the front ply panel thereof. The specific mailing envelope structure resulting from web 110 is disclosed in detail in my U.S. Pat. No. 3,956,049, see particularly FIGS. 25-30 thereof.

A second web, designated 210, is illustrated in FIGS. 13-24 and includes two contiguous longitudinally extending panels, wherein front ply panel 244 is adjacent back ply panel 50 and includes a window 224 for exposing an address-bearing portion of an under ply panel. The specific mailing envelope structure resulting from web 210 is disclosed in detail in my aforementioned abandoned application, Ser. No. 433,463, see particularly FIGS. 1-8 thereof.

FIGS. 1 and 13 of the present invention illustrate the preliminary steps necessary to prepare webs 110 and 210, respectively, to generate the complete blanks and resulting articles of the present invention and vary only with respect to the detail of the respective mailing envelope structures. Therefore, to facilitate an understanding of similarities between the two embodiments herein disclosed, reference numerals of the 100 series designate the various features of web 110, and reference numerals of the 200 series designate the various features of the web 210. The last two digits in each series identify corresponding features wherever such exist. Reference numerals 100 designate features of the present invention which are common to both embodiments of the invention.

The preliminary steps required to prepare web 110 are shown generally in FIG. 1 and will vary somewhat depending upon the precise configuration of the final article. Certain identifying and instructional indicia is applied to either one or both surfaces of the web at printer 112. Inventory control data may be added at station 114, for example, run number, date, form style number or similar information. This control data is generally added to a discardible portion of the form and is deleted from the final article. One or more continuous series of line holes 171 may be provided at punch 116. The line holes are adapted to be engaged by sprocket gears or the like whereby the finished form is advanced through subsequent processing stages. The form is divided by transverse weakened lines 151 and 152 and the like into a series of interconnected, transversely spaced subdivisions each defining one web of an article blank. Longitudinal weakened lines 146 and 147, applied at station 120, divide the continuous web into a plurality of longitudinal continuous panels 50, 144 and 145 which collectively span the width of the web. Panel 144 defines the front ply panel of the mailing envelope and panel 50 defines a back ply panel common to both the mailing envelope and a return envelope. Glue 51 is applied to the upper surface of the web 110 at station 52 and panel 144 is thereafter folded at weakened line 146 by any suitable means to be disposed in direct, overlying relationship with intermediate, discardible panel 145 at station 128, as particularly disclosed in my U.S. Pat. No. 3,956,049 generating a continuous web 110 having back ply panel 50 in side-by-side juxtaposition with front ply panel 144.

The preliminary steps required to properly prepare the endless web 210 are shown generally in FIG. 13 and also vary depending upon the precise configuration of the final article. The manufacture of this web is particularly disclosed in my aforementioned co-pending application Ser. No. 433,463. Certain identifying and instructional indicia is applied to either or both sides of the web at printer 212. Inventory control data may be added at station 214 and may include, for example, run number, date, form style number or similar information. This control data is generally added to a discardible portion of the form and is deleted from the final article. Generally, one or more continuous series of line holes 271 are supplied at punch station 216. The form is divided at station 218 by transverse weakened lines 251 and 252 into a series of interconnected subdivisions each defining one web of a final article blank. Longitudinal weakened line 247 supplied at station 220 divides the continuous web into a pair of longitudinal, contiguous panels 244 and 50, wherein panel 244 defines the front ply panel of the mailing envelope and is disposed in side-by-side juxtaposition with panel 50, which defines the back ply panel common to both the mailing envelope and the return envelope. Window 224 in panel 244 is provided at station 221 for exposing an addressee contained on an under ply of the resulting stuffed, sealed envelope assembly.

Thus it can be seen that web 110, or web 210 or other similarly prepared webs may be utilized to provide the first web of the present invention, wherein the front ply panel of the mailing envelope is disposed in side-by-side juxtaposition with the back ply panel common to both the mailing envelope and the return envelope.

Glue or other adhesive 51 is selectively applied to web 110 and web 210 at station 52, see FIGS. 2 and 14, respectively, and is supplied at least to the marginal portions of the upper surface of back ply panel 50. It is advantageous to supply glue to at least one surface of the front ply panel of the mailing envelope, particularly shown in FIGS. 4 and 16. Therefore, where web 110 is utilized to generate the front ply panel of the mailing envelope, fold station 128 is necessarily subsequent to glue applying station 52, permitting the application of glue 51 to the under surface of the front ply panel 144. The glue 51 is generally of an initially inactive type, in a condition having an affinity for the surface of the web when applied but quickly becoming "inactive", as that term is used herein, until reactivated at station 67 illustrated in each of FIGS. 3 and 15. One example of initially inactive adhesive is a hot-melt glue of the type having an affinity for the surface of the web when applied at station 52, quickly becoming inactive until heated. Glue of this type is applied in an adherent, tacky, liquified state, thereafter transformed to a nontacky state in which it remains until heated at station 67. It should be understood that other types of adhesive bonding could be utilized without departing from the spirit of the invention. One such example is known as self-stick adhesive, wherein the adhesive once applied will not adhere to anything but another coating of the same adhesive. Utilization of this adhesive would require replacement of the heat source at 67 with a nip-roll for applying pressure to the adhesive contact areas. It should be understood that for purposes of the present disclosure and claims an adhesive of the self-stick type is considered initially inactive, and is said to be activated when placed in direct contact with another surface having the same adhesive coating.

After application of glue 51 to web 110 or 210, additional processing steps are performed to generate a series of interconnected blanks each suited for subsequent processing into a combination mailing envelope and return envelope having a common back ply panel. It should be understood that the process is identical for each of webs 110 and 210 and is illustrated with the former in FIGS. 2 and 3 and the latter in FIGS. 14 and 15.

A second endless web of material 53 is properly prepared by steps in a preliminary process similar to that illustrated in either FIG. 1 or FIG. 13, wherein the web is transversely divided by lines 54 and 55 or the like into a series of interconnected subdivisions. Various other tear lines, as well as pre-printed indicia are also supplied. Where hot-melt glue is utilized, adhesive need not be applied to the under surface of web 53. However, where self-stick adhesive is applied to the upper surface of panel 50, a matching pattern of self-stick adhesive is supplied to the under surface of web 53. Web 53 approximates the width of panel 50, each subdivision defining a front ply panel of a return envelope.

After preliminary processing, web 53 is collated with the first web and disposed in direct, overlying relationship with panel 50 thereof at station 56. Line holes 71, corresponding with certain of line holes 171 or 271 are useful in establishing proper registration. Where self-stick adhesive is utilized, a nip-roll 57 may be incorporated at station 56 to effect a bond between three marginal portions of panel 50 and web 53, generating a return envelope pocket therebetween, open at a fourth margin 58. Where hot-melt glue or similar adhesive is utilized, other activating means, such as a heat source may be provided at station 56 to effect a bond between the three registered edges of panel 50 and web 53.

Collation of second web 53 with the first web and in registry with panel 50 completes the series of interconnected blank forms, each suited for subsequent processing into a combination mailing envelope and return envelope having a common back ply panel. It should be understood, where web 110 is utilized, fold station 128 is a part of the process, whether performed prior to or subsequent to collating station 56. Each of the interconnected blanks includes a back ply panel common to a mailing envelope and return envelope, having a front ply panel of a return envelope in direct overlying relationship therewith and a front ply panel of a mailing envelope in side-by-side juxtaposition and integral therewith. The interconnected blanks may be stored in this form or subsequent steps may be performed prior to station 59, where the blanks are accordion folded, rolled or otherwise suitably accumulated.

A third endless web 60, defining an insert ply for the mailing envelope, is either supplied prior to accumulation or at the time the form is subsequently used. Web 60 is properly prepared by steps in a preliminary process similar to that illustrated in either FIG. 1 or FIG. 13, and where hot-melt glue is utilized, adhesive need be provided only on either the upper surface of web 53 or the lower surface of web 60. Where self-stick adhesive is utilized, a matching pattern must be supplied on each abutting surface and would be supplied during the preliminary process to both surfaces of web 60 and web 53. The adhesive pattern extends about the three marginal edges which correspond to the outer edges of the return envelope, as shown in FIGS. 7, 8, 19, and 21. Web 60 approximates the width of panel 50 having one margin 85 spaced inward from any glue adjacent the marginal edge 147 or 247. The web is collated into registered overlying relationship with web 53 at station 61. Nip-roll 63 or other glue activating means may be provided at station 61 to effect a bond between 60 and 53. It should be understood that web 60 may be collated with the series of blanks prior to accumulation at 59 or subsequent thereto, when the blanks are later used.

Subsequent processing steps, illustrated in FIGS. 3 and 15, produce a final article from the continuous series of interconnected blanks accumulated at station 59. The continuous form, including insert web 60 is advanced through a controlled printing process 65 wherein original indicia is applied to the exposed upper surface of web 60 when web 110 is utilized original indicia 81 is also applied to the exposed upper surface of panel 144 as disclosed in my Patent 3,956,049. The form is then folded at station 66, disposing the front ply panel of the mailing envelope in direct, overlying relationship with web 60 thereby concealing at least a portion of the indicia contained thereon.

The adhesive coatings applied at station 52 and in similar preliminary steps form a permanent seal between and permanently bond marginal edges of the various plies to one another, generating a series of stuffed, sealed mailing envelopes each including a return envelope, having a back ply panel common to both the mailing envelope and the return envelope, and including an insert ply containing original, directly applied indicia. Where hot-melt glue or the like is utilized a heat source located at station 67 activates the glue. Where self-stick glue or the like is utilized a nip-roll or similar activating mechanism is required. Excess and marginal regions, including the various line holes, are severed from the continuous form at station 68, afterwhich the continuous series of stuffed, sealed envelopes are separated into individual articles at station 69 for distribution at 70. It should be understood where web 110 is utilized, discardible panel 145 is severed with other excess material at station 69.

FIGS. 4-12 illustrate the various steps in the process for generating the stuffed, sealed combination mailing envelope and return envelope utilizing web 110. FIG. 4, taken at line 4—4 of FIG. 2, illustrates web 110 after application of bands of hot-melt glue 51 and/or 51a along the marginal edges defined by the various lines 151, 152, 180 and 181, defining the outside periphery of the various weakened envelope panels. Each tear line 147 T1, inward of glue band 51 and outside of band 51a, is located an equal distance from respective lines 180 and defines a tear strip S, FIG. 9, in the final assembled article. Tear lines T2, T3 and T4 located on panel 50, and provide means for separating the return envelope from the final article.

Web 53, illustrated in FIG. 5 taken at line 5—5 of FIG. 2, is collated wth panel 50, and the various tear lines T1, T2, and T3 are placed in registry with respective like identified tear lines in panel 50. Weakened lines 54, 55 and 80 are likewise in respective weakened lines 151, 152 and 180 and define three peripheral boundaries of the return envelope. Addressee 72 and postage permit 73 or the like are pre-printed, providing an addressed return envelope.

Web 60, illustrated in FIG. 6 taken at line 6—6 of FIG. 2, is next collated into direct, overlying relationship with web 53, like identified marginal and tear lines 54, 55, 80, T1, T2, and T3 of the various webs placed in respective registry. The under surface of web 60 is illustrated in FIG. 7, and includes a band of hot-melt glue 83 spanning the space between peripheral boundary lines 54, 55 and 80, and tear lines T1, T2 and %3.

Web 110 is folded along line 146 at station 128, disposing panel 144 in direct, overlying relationship with panel 145, see FIG. 8, afterwhich the continuous series of blanks may be accumulated.

The blank, as illustrated in FIG. 8, is shown after application of original addressee indicia 81 and invoice indicia 81a to panel 144 and web 60, respectively. After application of indicia 81 and 81a, web 110 is folded along continuous fold line 148 at station 66, placing panel 144 in direct, overlying relationship with web 60. The adhesive is then activated at station 67, bonding the various plies to one another about their peripheral margins, afterwhich the excess marginal portions may be removed along lines 180 and 181, completing the stuffed, sealed envelope illustrated in FIG. 10.

Tear strip S may be removed along tear line T1, inward of the glue bands along margin 180, providing access to the mailing envelope pocket. The front ply 144 of the mailing envelope may then be removed by tearing along tear lines T2, T3 and T4 inward of the glue bands on panels 144 and 50 and web 60, thereby separating the insert material, the return envelope and the front ply of the mailing envelope from one another. The band of glue 51'a on panel 50, extending inward of lines T1, T2 and T3 permanently bonds web 53 to panel 50, generating a return envelope pocket open along margin 58. Generally, web 53 is of a lesser width than panel 50, and a band of moistenable glue M is provided on the extending portion of panel 50, providing a sealable flap for the return envelope.

FIGS. 16–24 illustrate a stuffed, sealed envelope assembly utilizing web 210, wherein indicia on the front of the mailing envelope is replaced by window 224 for exposing addressee indicia 81 contained on insert ply 60. The embodiment is further distinguishable from the form of FIGS. 4–12 in that one peripheral margin is defined by fold line 247, generating a mailing envelope having a front ply and back ply hingedly secured to one another, eliminating the necessity of the band of glue and tear line T4 provided along margin 147 of the earlier embodiments, see FIG. 4.

While the embodiments of FIGS. 4–12 and 16–24 each illustrate a form utilizing hot-melt glue, it should be understood that self-stick or other adhesive could readily be used, as herein described, requiring matching adhesive patterns on the various abutting plies.

While specific embodiments and modifications of the invention have been illustrated in detail, it should be understood that the foregoing is merely illustrative and not intended to limit the scope and spirit of the appended claims.

What is claimed is:

1. A method of producing a series of interconnected blanks each suited for subsequent processing into a combination mailing envelope and return envelope having a common back ply panel, comprising the steps of:
   a. continuously advancing a first endless web of material toward an accumulating station;
   b. transversely subdividing said first web into a series of elongate interconnected subdivisions each having the longitudinal direction of said subdivisions corresponding to the transverse direction of said web;
   c. forming foldlines on said web to longitudinally subdivide each of said interconnected transverse subdivisions into at least three panels, said panels extending transversely of said web to span the width thereof, with one panel defining a front ply panel of the mailing envelope, another panel defining a back ply panel common to both the mailing and return envelope, said front and back panels being non-abutting, and a third panel of which forms a discardable panel and connects said front and back panels together;
   d. forming a further foldline on said web to be located on said discardable panel between the edges thereof, said foldline extending longitudinally of said web continuously for essentially the entire length of said web;
   e. selectively applying adhesive to adjacent at least three outer marginal edges of an upper surface of said front and back ply panels;
   f. continuously advancing a second endless web of material of a width approximating the width of said back ply panel toward an accumulating station;
   g. transversely subdividing said second web into a series of interconnected subdivisions, each of which defines a front ply panel of the return envelope;
   h. collating said advancing second web with said advancing first web for disposing three marginal edges of each front ply panel of the return envelope in registered overlying relationship with said three marginal edges of a corresponding back ply panel, generating the series of interconnected blanks;
   i. folding said front panel over into juxtaposed relationship with said discardable panel;
   j. accumulating said series of interconnected blanks for subsequent processing;
   k. moving said front ply panel from juxtaposed relationship with said discardable panel into over-lying relationship with said second web; and
   l. removing said discardable panel from said web.

2. A method as called for in claim 1, including the additional steps of:
   m. continuously advancing a third endless web of material of a width approximating the width of said back ply panel toward an accumulating station;
   n. transversely subdividing said third web into a series of interconnected subdivisions each of which defines an insert ply panel of the mailing envelope;
   o. collating said advancing third web with said advancing first and second webs for disposing three marginal edges of each insert ply panel in registered over-lying relationship with said three marginal edges of a corresponding front ply panel of the return envelope.

3. A method as called for in claim 2, including the additional steps of:
   p. advancing said series of interconnected blanks including said insert ply panels toward an indicia applicating station;
   q. applying original indicia directly to an upper surface of said insert ply panel; and
   r. folding and permanently bonding the front ply panel of the mailing envelope in overlying relationship with the insert ply panel and the front ply panel of the return envelope, thereby completing a series of interconnected combination mailing envelopes and return envelopes each having a common back ply panel and including an insert ply panel bearing original, directly applied indicia.

4. A method as called for in claim 3, including the additional step of separating the series of interconnected combination envelopes into individual items.

5. A method as called for in claim 3, which includes the step of applying original indicia in step "q" to an upper exposed surface of the front ply panel of the mailing envelope.

6. A method as called for in claim 3, which includes the step of providing a window in front ply panel for exposing a portion of the original indicia on the insert ply panel.

7. A method as called for in claim 2, wherein steps —"m–o"— are performed subsequent to step —"h"— and prior to step —"j"—.

8. A method as called for in claim 2, wherein steps —"m–o"— are subsequent to step —"j"—.

9. A method as called for in claim 2, including the steps of:
 i. applying adhesive to said three marginal edges of at least one surface of the second web prior to step —"h"—; and
 ii. applying adhesive to said three marginal edges of at least one surface of the third web prior to step —"o"—.

* * * * *